Figure 1:
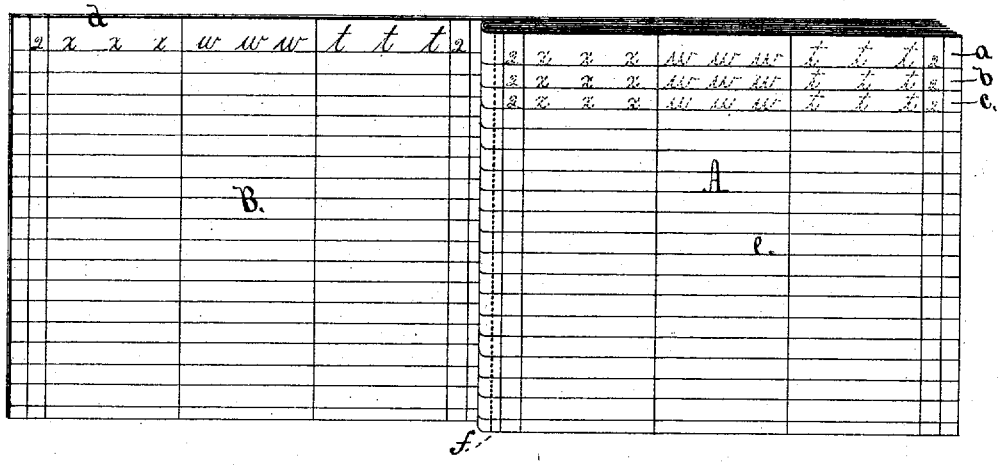

M. A. REQUA & E. DUNN,

Said DUNN assignor, by mesne assignments, to said REQUA.

Copy Book.

No. 9,736. Reissued May 31, 1881.

WITNESSES:

Joseph A. Miller Jr

Wm. L. Cooper

INVENTORS:

M. Augusta Requa

Eleanor Dunn by Joseph A. Miller
their attorney

N. PETERS, Photo-Lithographer, Washington, D. C.

UNITED STATES PATENT OFFICE.

M. AUGUSTA REQUA AND ELEANOR DUNN, OF NEW YORK, N. Y., SAID DUNN ASSIGNOR, BY MESNE ASSIGNMENTS, TO SAID REQUA.

COPY-BOOK.

SPECIFICATION forming part of Reissued Letters Patent No. 9,736, dated May 31, 1881.

Original No. 189,574, dated April 17, 1877. Application for reissue filed March 19, 1880.

*To all whom it may concern:*

Be it known that we, M. AUGUSTA REQUA and ELEANOR DUNN, both of the city, county, and State of New York, have invented a new and useful Improvement in Copy-Books; and we hereby declare that the following is a full, clear, and exact description of the same, reference being had to the accompanying drawings, forming part of this specification.

The object of our invention is to improve copy-books so as to facilitate the teaching of the art of writing.

In teaching young children the art of writing much difficulty is frequently experienced in imitating copies, and it is desirable that every practical means be resorted to for their encouragement and assistance. The first copies imitated are usually uncertain and awkward, and when the first lines of a page in the copy-book are filled with these, children become discouraged and lose the ambition to persevere and correct these first efforts, as they form an indelible record. Recognizing this difficulty, we have found it expedient and advantageous to employ two pages for the same copy. Upon one of these pages, which is the trial-page, appears the copy, (preferably indicated in dotted lines several times,) and the remainder of the sheet is left blank for free-hand writing. Upon the other is the regular copy, of which the child, after using the trial-page, is prepared to produce a good specimen copy.

It has been customary to use two sets of copy-books, one for practicing in and the other for the clean copy. The objection to this is that two books are required. Loose scraps of paper have also been used to practice on, and the objection to this is that such scraps are not firmly held, and are liable to shift their positions, so that the lines on the scrap of paper are not parallel to the lines on the copy-page, and do not facilitate practice as much as leaves or sheets held firmly in the book, the lines of which are parallel with the copy to be imitated.

By our newly-constructed writing-book the use of extra books and loose scraps of paper is avoided, and two leaves, held sufficiently firm to enable the child to make correct copies, are supplied, the one a detachable trial-leaf and the other a permanent leaf bound in the book.

The outlines of letters have heretofore been made in copy-books, so that tracing can be practiced before imitation is attempted. This idea may be utilized in the construction of our copy-books.

The pupils having the trial-page on which to practice before attempting to write on the ordinary copy-page, with the same set copy before them, are enabled to acquire confidence and skill before proceeding to write on the permanent page, and on removing the trial-pages from the book, after the copying has been accomplished, the book will present a neater appearance than it would if no trial-pages had been used, because the first mistakes made on the trial-pages will, to a considerable extent, be avoided on the copy-pages, and these, therefore, present a cleaner and more perfect appearance, and encourage the pupils to greater efforts.

Figure 2:
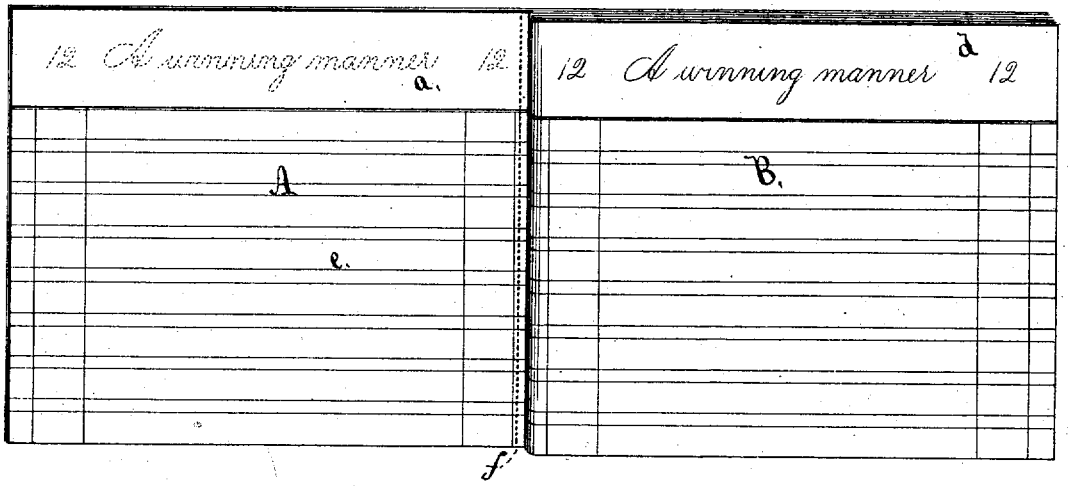

In the drawings, Figure 1 represents an open book, showing the trial-page A and a copy-page, B. Fig. 2 is another view of the copy-book, showing the trial-page turned over, and therefore the trial-page is on the left-hand side, which in Fig. 1 is on the right-hand side.

*a*, *b*, and *c* indicate the copies in dotted lines on the trial-page, to be traced by the pupils, and *d* is the same copy on the permanent page, to be imitated.

*e* is the blank space on the trial-page, ruled in the same manner as the copy-page. On this trial-page the beginners make their first experiments with the copy plainly before them, and with the conditions in all respects like the final or clean copy-page.

*f* indicates a line of perforations on the trial-page, near the binding, used to facilitate the removal of the trial-page and leave the book in a neater condition than it would be if the trial-page were torn or cut out.

A progressive series of books formed in accordance with our improvement will be found essentially advantageous in teaching the art of penmanship.

Having thus described our invention, we claim as new and desire to secure by Letters Patent—

A writing copy-book having, in addition to the usual pages of set copy or words and letters to be imitated, interposed removable trial-leaves, provided with one or more lines of letters corresponding with the set copy, outlined or indicated by dots or other suitable means, and with a space for free-hand writing, substantially as and for the purpose specified.

M. AUGUSTA REQUA.
ELEANOR DUNN.

Witnesses:
L. A. LEVY,
P. B. GASTON.